United States Patent
Pathak et al.

(10) Patent No.: US 10,101,824 B2
(45) Date of Patent: Oct. 16, 2018

(54) APPARATUS, SYSTEM, AND METHOD TO STABILIZE PENMANSHIP AND REDUCE TREMOR

(71) Applicant: Verily Life Sciences LLC, Mountain View, CA (US)

(72) Inventors: Anupam Pathak, Mountain View, CA (US); Michael Allen, San Francisco, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 78 days.

(21) Appl. No.: 15/220,905

(22) Filed: Jul. 27, 2016

(65) Prior Publication Data

US 2018/0032159 A1     Feb. 1, 2018

(51) Int. Cl.

| | |
|---|---|
| *G06F 3/0354* | (2013.01) |
| *G06F 3/038* | (2013.01) |
| *G06F 3/0488* | (2013.01) |
| *G06T 3/40* | (2006.01) |
| *G06T 5/00* | (2006.01) |
| *G06T 5/20* | (2006.01) |
| *G06K 9/24* | (2006.01) |

(52) U.S. Cl.
CPC ........ *G06F 3/03545* (2013.01); *G06F 3/0383* (2013.01); *G06F 3/04883* (2013.01); *G06K 9/24* (2013.01); *G06T 3/40* (2013.01); *G06T 5/002* (2013.01); *G06T 5/20* (2013.01); *G06F 2203/0384* (2013.01)

(58) Field of Classification Search
CPC ...................................................... G06K 9/24
See application file for complete search history.

(56) References Cited

U.S. PATENT DOCUMENTS

| | | | |
|---|---|---|---|
| 2,355,087 A | 8/1944 | Lauder et al. | |
| 3,066,185 A | 11/1962 | Leavitt et al. | |
| 3,864,515 A * | 2/1975 | Fee, Jr. ................. | G09B 11/00 178/18.01 |
| 4,135,245 A * | 1/1979 | Kemplin ............... | B43L 13/024 346/139 R |
| 4,356,632 A | 11/1982 | Anderka | |
| 9,189,121 B2 | 11/2015 | Shahparnia et al. | |

(Continued)

OTHER PUBLICATIONS

International Search Report and Written Opinion from the International Searching Authority dated Sep. 13, 2017, for International Application No. PCT/US2017/042640, filed Jul. 18, 2017, 13 pages.

*Primary Examiner* — Chad Dicke
(74) *Attorney, Agent, or Firm* — Christensen O'Connor Johnson Kindness PLLC

(57) ABSTRACT

A portable writing apparatus includes a writing instrument carriage to hold a writing instrument and an actuator system coupled to the writing instrument carriage to move the writing instrument carriage. A controller is electrically coupled to the actuator system, and the controller includes logic that when executed by the controller causes the controller to perform operations including: receiving input data including a user's handwritten characters; and controlling the actuator system to move the writing instrument carriage in response to the input data. The writing instrument carriage traces a shape of the user's handwritten characters.

22 Claims, 5 Drawing Sheets

(56) References Cited

U.S. PATENT DOCUMENTS

| | | | |
|---|---|---|---|
| 2004/0151218 A1* | 8/2004 | Branzoi | G06F 3/0386 372/25 |
| 2008/0158153 A1* | 7/2008 | Sohn | A63F 13/04 345/157 |
| 2013/0297022 A1 | 11/2013 | Pathak | |
| 2014/0035828 A1 | 2/2014 | Hyde et al. | |
| 2014/0073994 A1* | 3/2014 | Machado | A61B 5/6897 600/595 |
| 2015/0219451 A1 | 8/2015 | Pettersson et al. | |
| 2016/0162042 A1* | 6/2016 | Liberty | G06F 1/3215 345/158 |

* cited by examiner

APPARATUS, SYSTEM, AND METHOD TO STABILIZE PENMANSHIP AND REDUCE TREMOR

TECHNICAL FIELD

This disclosure relates generally to equipment for aiding the disabled.

BACKGROUND INFORMATION

A tremor is a medical condition characterized by involuntary, and somewhat continuous, muscle contractions and relaxations. It is one of the most common involuntary movements and can affect the head, face, eyes, arms, hands, vocal folds, trunk, and legs. Tremors are often symptomatic of a neurological disorder.

Tremor is sometimes associated with damage to the parts of the brain that control the shaking muscles. Conditions that can cause tremor include stroke, multiple sclerosis, brain injury, chronic kidney disease, and Parkinson's disease. There are several different categories of tremor. Resting tremors are worse at rest and commonly result from Parkinson's disease. Contraction tremors are worse during muscle contraction. Posture tremors are worse when the patient maintains a posture against gravity. And intention tremors are tremors that worsen during intention (for example, as a patent's finger nears a target).

While tremor can be managed though lifestyle changes (e.g., eliminating tremor "triggers" like caffeine and other stimulants, attending physical therapy, etc.), there is often no cure for tremor. Furthermore, daily activities are still complicated by the tremor even with management. For example, activities requiring small precise movements can be difficult or impossible as a result of the constant shaking.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of an apparatus and method for stabilized penmanship are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Disclosed herein is a system and method for stabilized penmanship. The present inventors have observed that many people suffering from hand tremors still desire to write handwritten notes and letters. But tremors may prevent a person from producing legible or visually appealing handwritten letters. Using the systems presented here, a user may be able to write handwritten notes with a stylus, and tremor motions can be filtered out of the user's notes. A mechanical device can receive the filtered characters/drawings, and write them down on a writing surface for the user. In this way, the user may be capable of producing letters/notes/illustrations in their own handwriting unencumbered by debilitating tremors.

Figure 1A:
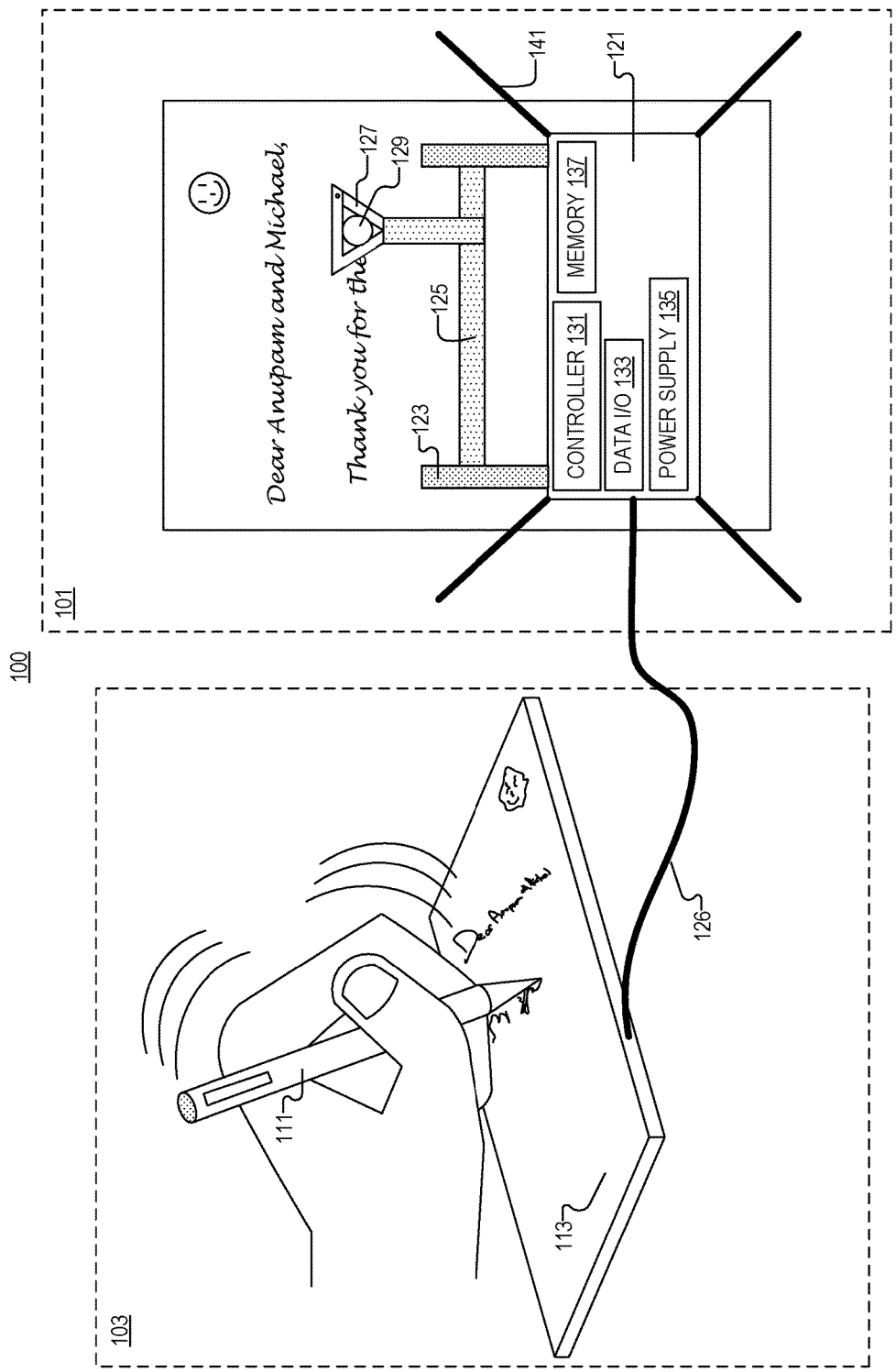
FIG. 1A illustrates a system for stabilized penmanship, in accordance with an embodiment of the disclosure.

FIG. 1A illustrates system 100 for stabilized penmanship, in accordance with an embodiment of the disclosure. Generally, system 100 includes writing stage 101, and handwriting input source 103. More specifically, writing stage 101 includes body 121, actuator system (which in this embodiment includes a Y-actuator 123 and an X-actuator 125), writing instrument carriage 127, writing instrument 129, and legs 141. Handwriting input source 103 includes stylus 111 and tablet 113 (which may be a specific or general purpose computer). In this embodiment, writing stage 101 and handwriting input source 103 are electrically coupled by cable 126; however, in other embodiments tablet 113 may wirelessly couple to writing stage 101.

In the depicted embodiment, body 121 may, for example, be a plastic or metal casing housing controller 131, data input/output 133, power supply 135, and memory 137. Body 121 may also house other common electronic components such as heat syncs, fans, switches, etc. The various electronics contained in body 121 may be used to control the actuator system (which in this embodiment includes a Y-actuator 123 and an X-actuator 125). As depicted, the actuator system may be coupled to the writing instrument carriage 127 to move writing instrument carriage 127 in a two-dimensional ("2D") plane, which may correspond to a writing surface (e.g., a piece of paper). The 2D plane may include the X-direction and Y-direction, referred to below. In this embodiment, controller 131 is electrically coupled to the actuator system, and controller 131 includes logic that when executed by controller 131 causes controller 131 to perform operations including: receiving input data describing a user's handwritten characters; and controlling the actuator system to move writing instrument carriage 127 in response to the input data. In the depicted embodiment, the Y-actuator 123 of the actuator system includes a set of bars which extend in a Y-direction, and which hold the X-actuator 125 of the actuator system. The Y-actuator 123 may hold the X-actuator 125 via mechanical tracks disposed on the set of bars of the Y-actuator 123. In this embodiment, the X-actuator 125 is a bar which extends in an X-direction, which in the depicted embodiment is orthogonal to the Y-direction. The bar of the X-actuator 125 may be moved in the Y-direction along the mechanical tracks disposed on the set of bars of the Y-actuator 123. Similarly, writing instrument carriage 127 may be disposed in mechanical tracks on the bar of the X-actuator 125, and may be able to slide in the X-direction across the bar of the X-actuator 125. In a different or the same embodiment, Y-actuator 123 and X-actuator 125 may be implemented using miniature lead screws to control the motion of writing instrument carriage 127.

As shown, controller 131 instructs the actuator system to move writing instrument carriage 127 to recreate/trace the shape of the user's handwritten characters on a card smaller than an 8.5×11 inch sheet of paper. Writing stage 103 may have smaller lateral dimensions than an 8.5×11 inch sheet of paper. In the depicted embodiment, the input data is from tablet 113 which is recording the user's stylus strokes (which may be referred to herein as "pen strokes") from stylus 111. As shown, the user is attempting to write a "thank you" letter and draw a "smiley face" in the upper right hand corner of the letter, but the stylus strokes are badly distorted by tremor. This input data (pen strokes) is filtered to remove/reduce tremor data from the user's handwritten characters. Filtering may be achieved through both motion scaling (either reducing the relative size of the jitters by down-scaling the size of the characters, or increasing the size of the characters through similar motion scaling to help combat micrographia—a result of Parkinson's disease) and through data filtering techniques such as low pass filtering, notch filtering, or weighted Fourier linear combination. In some embodiments, the input data may be filtered by adaptive filtering methods. The writing programs/hardware running on tablet 113 may "learn" the user's unique tremor and adjust filtering accordingly. For example, the user may have a relatively fast paced tremor, in which case tablet 113 may apply a low pass filter with a higher than normal frequency cut off.

Similarly, rather than continuously adapting to the user's tremor, system 100 may be initially calibrated to a user's particular tremor. For example, the user may write a series of letters or sentences. System 100 may analyze what was written, and how much the tremor distorts the letters. Then system 100 may adjust its tremor filtering technique to the individual user. Additionally, the user may visually inspect a number of filtering techniques applied to a sample of the user's writing, and chose the single technique (or multiple techniques used in parallel) that achieves the most visually pleasing result. One skilled in the art will realize there are many ways to filter shaking motions from handwriting, and that any of these techniques may be used in accordance with the teachings of the present disclosure.

Figure 1B:
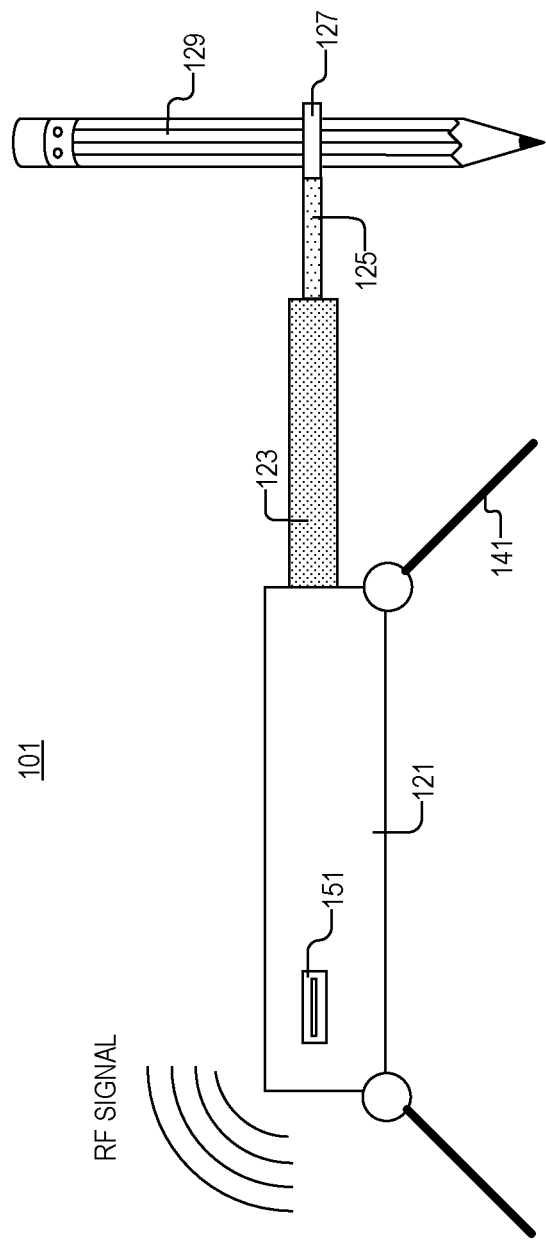
FIG. 1B illustrates the writing stage apparatus of FIG. 1A, in accordance with an embodiment of the disclosure.

FIG. 1B illustrates the writing stage 101 of FIG. 1A, in accordance with an embodiment of the disclosure. A side view of writing stage 101 is depicted. As shown writing stage 101 is communicating wirelessly with handwriting input source 103 (via an RF signal) since cable 126 has been unplugged from port 151 (e.g., a USB port). Port 151 may be used for charging the power supply (e.g., power supply 135) of writing stage 101 and directly communicating with other electronic components (e.g., controller 131, data input/output 133, and memory 137) in body 121. In one embodiment, the power supply may be a battery such as a rechargeable lithium ion battery, and memory may include RAM, ROM, flash memory or the like. The controller may be a general purpose microcontroller (e.g., Arduino™), or a microcontroller specifically designed for writing stage 101.

As illustrated, writing stage 101 stands on multiple (in this case four) legs 141 which are coupled to body 121. Legs 141 and actuator system (which in this embodiment includes Y-actuator 123 and X-actuator 125) may fold in, or retract into, body 121 for easy storage. In some embodiments, external components of writing stage 101 may fold/retract to be small enough to fit into a purse or pocket. For example, the actuator system may include one or more components (such as Y-actuator 123 and/or X-actuator 125) which fold towards or retract (partially or entirely) into body 121 of writing stage 101. For example, legs 141 may fold towards or retract (partially or entirely) into body 121 of writing stage 101. However, in operation, the actuator system of the depicted embodiment extends outward from body 121. In the depicted embodiment, writing instrument carriage 127 is holding writing instrument 129 (a pencil), but in other embodiments writing instrument 129 may be a pen or otherwise. Writing instrument carriage 127 may grasp writing instrument 129 via electronically or manually controlled clamps. Alternatively writing instrument 129 may be held in writing instrument carriage 127 via a locking mechanism (designed so that the user may insert writing instrument 129 into writing instrument carriage 127 and lock it into place). This allows the user to control the type of writing the writing stage 101 produces (ink, pencil led, paint brush, etc.). One skilled in the art will appreciate that many different techniques may be used to secure writing instrument 129 in writing instrument carriage 127 (e.g., electronic clamps, spring loaded clamps, screw-tight structures, etc.). Alternatively, writing instrument 129 may be a printer-cartage-type device that is removable and/or comes preinstalled with writing stage 101.

In the illustrated embodiment, the actuator system is coupled to writing instrument carriage 127 to move writing instrument carriage 127 away from the 2D plane, e.g. in a Z-direction orthogonal to the 2D plane. In the depicted embodiment, the X-direction, Y-direction, and Z-direction are orthogonal to each other, but that need not be the case in other embodiments. Thus, writing instrument carriage 127 can engage and disengage writing instrument 129 from a writing surface (e.g., a piece of paper). In one embodiment, writing instrument 129 is engaged/disengaged from the writing surface in response to spaces between the user's handwritten characters. For example, when the user lifts up the stylus, writing instrument 129 may also be lifted from the page. This may allow the user to write naturally and have writing stage 101 follow their exact motions. It is worth noting that the user's handwritten characters may include more than just letters (i.e., "A", "B", "C", etc.) and may include shapes, doodles, drawings, etc. all of which writing stage 101 may enable the user to naturally draw without tremor.

In the depicted embodiment, the actuator system includes at least two stepper motors, and the at least two stepper motors move independently from one another. Accordingly the movement of one stepper motor doesn't affect the movement of the other stepper motor. One stepper motor may be used by the Y-actuator 123 with another being used by the X-actuator 125. To facilitate movement in the Z-direction, one or more other stepper motors may be used and/or one or more devices such as brushed motors, squirrel-cage rotors, servo motors, solenoids, or the like.

One skilled in the art will appreciate that while only one shape of writing stage 101 is depicted here, writing stage 101 may take a number of configurations in accordance with the teachings of the present invention. For instance, legs 141 may not be present and a body 121 that is heavily weighted (like a paper weight) may be used—since this configuration may provide added stability. Additionally, while the depicted writing stage 101 is holding a pencil, in other embodiments, writing instrument carriage 127 may hold other tools to perform precision crafts such as cutting utensils, scribes, or the like (which should also be considered "writing tools," in accordance with the teachings of the present disclosure).

Figure 1C:
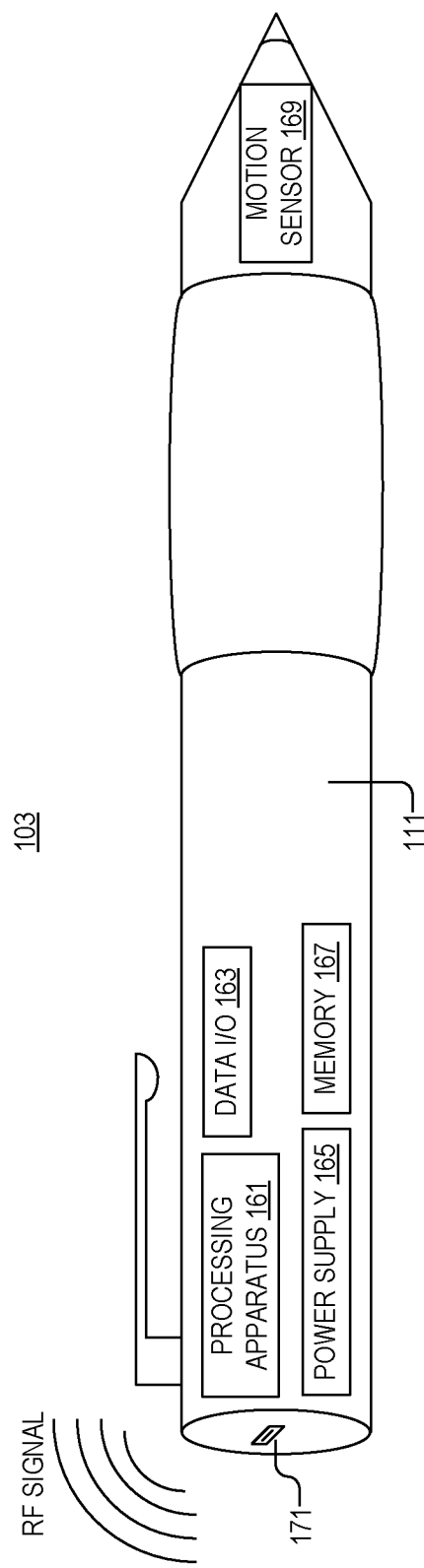
FIG. 1C illustrates a stylus, in accordance with an embodiment of the disclosure.

FIG. 1C illustrates a stylus 111, in accordance with an embodiment of the disclosure. While the embodiment in FIG. 1A depicted a relatively simple stylus 111 to draw on the screen of tablet 113 (with the processor of tablet 113 handling the tremor filtering), the embodiment illustrated in FIG. 1C shows a "smart" stylus 111. "Smart" stylus 111 contains the requisite processing capability (e.g., processing apparatus 161) to remove tremor data. Stylus 111 includes processing apparatus 161, data input/output 163, power supply 165, memory 167, and motion sensor 169.

In the depicted embodiment, stylus 111 may be used as a normal pen. Motion sensor 169 detects movement at the tip of stylus 111, and movement data is sent to memory 167 and/or processing apparatus 161. Stylus 111 may include an optical tracker (similar to the lasers used in optical mice), ball tracker (similar to those used in mechanical mice—but much smaller), or any other tracking system. Processing apparatus 161 may then filter tremor data from the movement data using any of the techniques described in connection with FIGS. 1A and 1B. Data input/output 163 may include a wireless transmitter to wirelessly transmit data to a writing stage (e.g., writing stage 101); the data describes the user's filtered handwritten characters. In one embodiment, stylus 111 may actually write like a normal pen/pencil (i.e., make marks on a writing surface) so the user can see what they are writing; conversely in other embodiments, the user may simply trace the shape of letters/symbols on a surface.

In the depicted embodiment, stylus 111 also has a micro port 171 (e.g., a micro USB port) to charge power supply 165 or communicate directly with other computers or a writing stage. Micro port 171 is coupled to data input/output 163.

Figure 2:
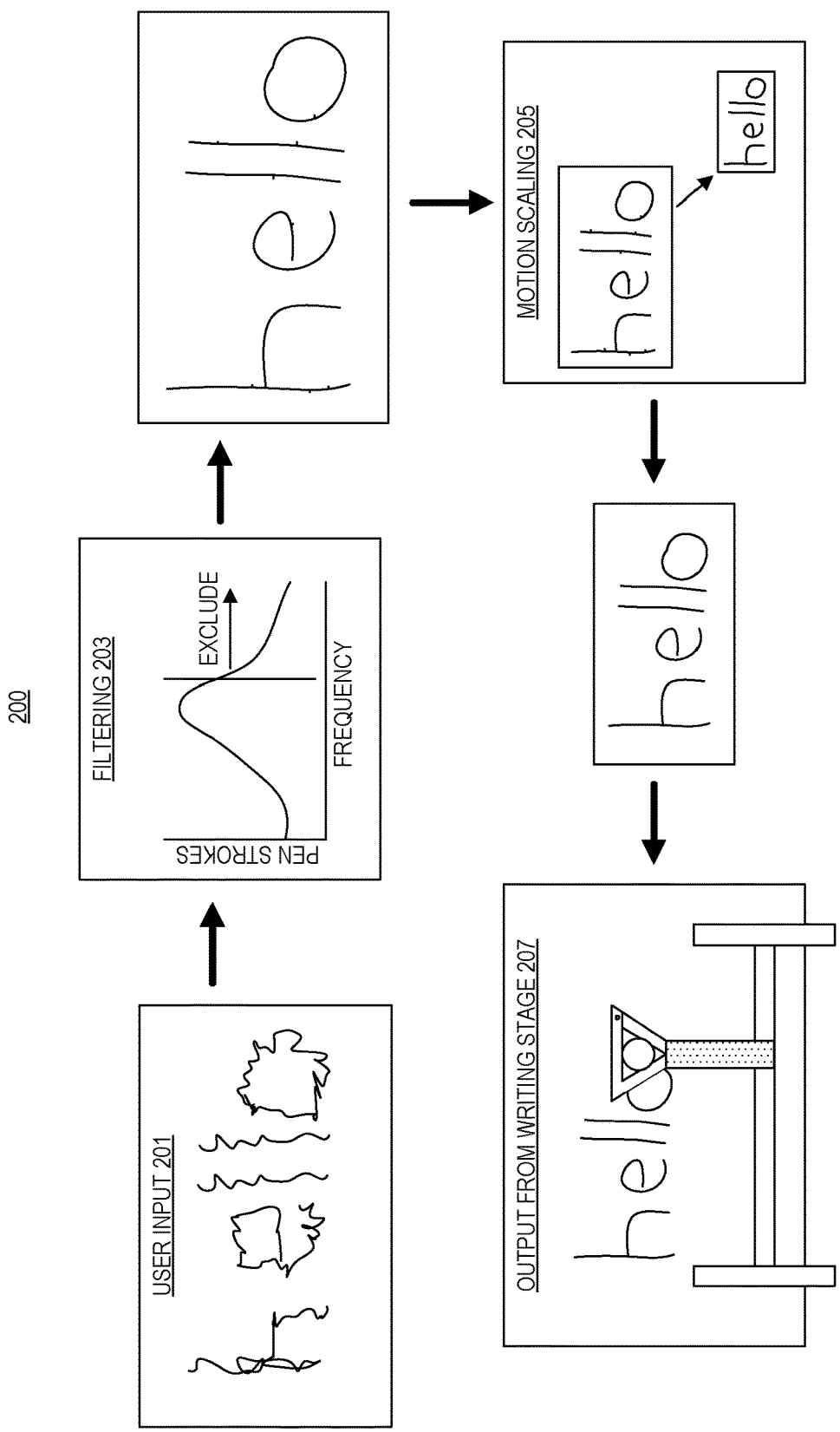
FIG. 2 shows a functional block diagram illustrating several handwriting stabilization techniques, in accordance with an embodiment of the disclosure.

FIG. 2 shows a functional block diagram 200 illustrating several handwriting stabilization techniques, in accordance with an embodiment of the disclosure. The order in which the blocks appear should not be deemed limiting. One skilled in the art will realize that in other embodiments blocks may be added to, or removed from, block diagram 200. Furthermore, the tremor filtering techniques may occur at the same time or in parallel.

Block 201 illustrates sending the user's handwritten input into the filtering system. As shown, the user has attempted to write the word "hello" but the letters are heavily distorted from tremor.

Block 203 shows filtering the user's handwritten input. The illustrated embodiment employs a simple low-pass filter to exclude/remove high-frequency pen strokes from the input data. In other embodiments, more complex filtering methods may be used including user-specific adaptive filtering, notch filtering, or weighted Fourier linear combination. In one embodiment, machine learning techniques may be employed to learn the user's specific tremor pattern and remove the tremor from the user's handwriting. As shown, filtering removes most distortion from the user's handwritten letters, but small distortions may still remain depending on the complexity of the filtering algorithms employed.

Block 205 shows motion scaling the user's handwriting data. Downscaling the size of the letters (e.g. so that characters recreated by the writing instrument 129 held by the writing instrument carriage 127 are smaller than the user's handwritten characters) may help to make remaining tremor strokes less noticeable. In other words, since large shakes in the hand drawn lines will likely be removed by filtering, down-scaling the size of the letters may help conceal small defects remaining after filtering.

Block 207 depicts outputting the filtered and downscaled characters from the writing stage. The writing stage uses mechanical actuators to trace the filtered letters. The writing stage may hold a pen, pencil, or other writing utensil, and the writing utensil may be used write the letters on a piece of paper. The stage may include a variety of sensors (e.g., pressure sensors, optical sensors, or the like) to ensure that the writing utensil is applying the proper amount of pressure to the paper, and that the lines drawn are legible. To this extent, the writing stage may use a feedback loop to manage the quality of the characters drawn.

Figure 3:
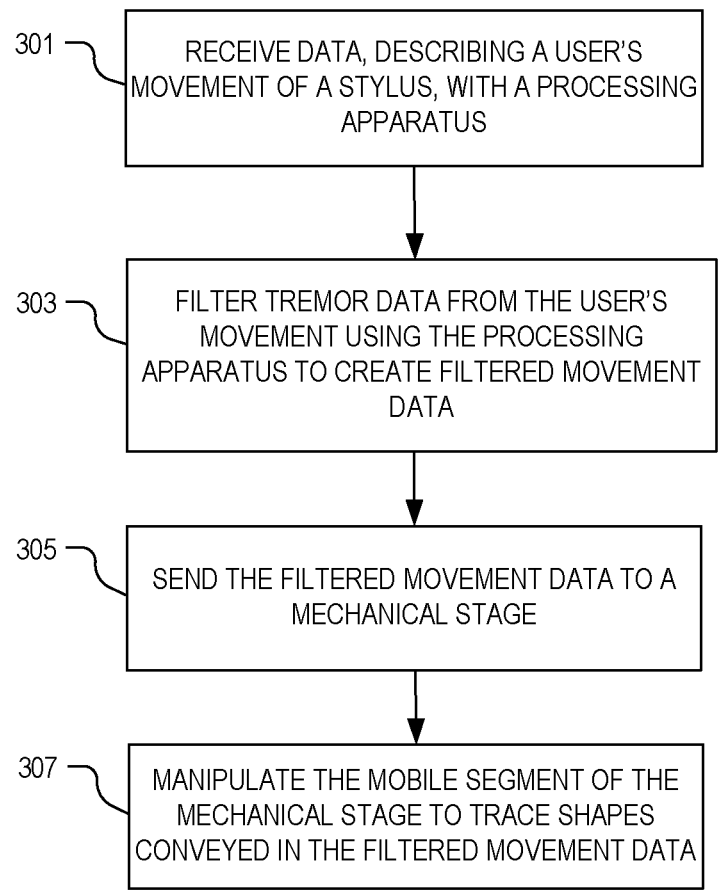
FIG. 3 is a flow chart illustrating a method of tremor reduction, in accordance with several embodiments of the disclosure.

FIG. 3 is a flow chart illustrating a method of tremor reduction 300, in accordance with several embodiments of the disclosure. The order in which some or all of process blocks 301-307 appear in method 300 should not be deemed limiting. Rather, one of ordinary skill in the art having the benefit of the present disclosure will understand that some of method 300 may be executed in a variety of orders not illustrated, or even in parallel.

Block 301 illustrates receiving data, describing a user's movement of a stylus, with a processing apparatus. In one embodiment, the stylus is intended to be used with a tablet, and the user draws on the tablet with the stylus. In another embodiment, the processing apparatus may be included in the stylus, and a motion sensor in the stylus captures the user's movement. In other embodiments, the stylus may be designed to write characters on a specialty pad which is transferred to a general purpose computer (or the internet/cloud), which functions as the processing apparatus.

Block 303 discloses filtering tremor data from the data describing the user's movement using the processing apparatus to create filtered movement data. In one embodiment, filtering includes adaptive filtering algorithms where the processing apparatus extracts user-specific tremor parameters from the data, and stores the user-specific tremor parameters in a memory. The processing apparatus removes the user-specific tremor parameters from the user's movement to create the filtered movement data. In another or the same embodiment, low pass filtering, notch filtering, or weighted Fourier linear combination may also be used. One skilled in the art will appreciate that the filtering algorithms used need not be static; the algorithms may receive updates to enhance the performance of the writing system or may self-update as they learn the user's tremor.

In one embodiment, the user's movement may be downscaled to further enhance the appearance of the user's handwriting. For example, after the filtering algorithms are applied, some residual shaking artifacts may be present in the movement data. By downscaling the writing, these defects become smaller and less noticeable in the final written document.

In one embodiment, the processing apparatus may recognize letters in the user's handwriting. In this embodiment, the user may select an option where the writing stage outputs a specific font of handwriting. For example, if the user's handwriting is still very messy even after filtering, the user can select a mode of operation where the user's handwritten characters are substituted for characters of a font. The user may select a calligraphic font or a less stylized font depending on the document the user is trying to write.

Block 305 depicts sending the filtered movement data to a mechanical stage. Sending the filtered movement data may be achieved either by wired or wireless transmission. The mechanical stage may include a mobile segment and an immobile segment. The mobile segment of the mechanical stage may be configured to move in a two-dimensional plane and hold one of a pen or pencil. The mobile segment of the mechanical stage may also be configured to move in a direction orthogonal to the 2D plane to disengage the pen or pencil from a writing surface.

Block 307 shows manipulating the mobile segment of the mechanical stage, in response to the filtered movement data, to trace shapes conveyed in the filtered movement data. These shapes may be characters in any language or may also include pictures. For example, the user could write a letter to a friend and end the letter by drawing a smiley face. The mobile segment of the mechanical stage may trace the words in the letter as well as the outline of the smiley face.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium may include any mechanism that provides (i.e., stores) information in a form accessible by a machine (e.g., a computer, network device, personal digital assistant, manufacturing tool, any device with a set of one or more processors, etc.). For example, a machine-readable storage medium may include recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

The following statements provide general expressions of the disclosure herein:

A. A portable writing apparatus, comprising:
a writing instrument carriage to hold a writing instrument;
an actuator system coupled to the writing instrument carriage to move the writing instrument carriage; and
a controller electrically coupled to the actuator system, wherein the controller includes logic that when executed by the controller causes the controller to perform operations including:
receiving input data describing a user's handwritten characters; and
controlling the actuator system to move the writing instrument carriage in response to the input data, wherein the writing instrument carriage recreates a shape of the user's handwritten characters.

B. The portable writing apparatus of statement A, wherein the input data is filtered to remove tremor data from the input data describing the user's handwritten characters.

C. The portable writing apparatus of statement A or B, wherein the input data is scaled to reduce a size of the user's handwritten characters.

D. The portable writing apparatus of any one of statements A-C, wherein the controller further includes logic that when executed by the controller causes the controller to perform operations including filtering the input data and/or scaling the input data.

E. The portable writing apparatus of any one of statements A-D, wherein the actuator system is coupled to the writing instrument carriage to move the writing instrument carriage orthogonal to a two-dimensional (2D) plane to engage and disengage a writing instrument from a writing surface.

F. The portable writing apparatus of any one of statements A-E, wherein the actuator system includes at least two stepper motors electrically coupled to the controller, and wherein the at least two stepper motors move independently from one another in repose to the input data.

G. A system, comprising:
a portable writing stage including:
a writing instrument carriage to hold a writing instrument;
an actuator system coupled to control the writing instrument carriage and move the writing instrument carriage; and
a controller electrically coupled to the actuator system to control a position of the writing instrument carriage by manipulating the actuator system;
a stylus to output data describing a user's handwritten characters; and
a processing apparatus to receive the data describing the user's handwritten characters from the stylus, and filter tremor data from the data describing the user's handwritten characters, wherein the processing apparatus electrically or wirelessly couples to the portable writing stage to output filtered data to the portable writing stage.

H. The system of statement G, wherein the processing apparatus down-scales the user's handwritten characters in the data received from the stylus.

I. The system of statement G, wherein the stylus has a pen form-factor.

J. The system of statement G, wherein the writing instrument carriage is configured to receive a pen or pencil, and wherein the actuator system is coupled to the writing instrument carriage to move the writing instrument carriage orthogonal to a two-dimensional (2D) plane to disengage the pen or pencil from a writing surface in response to spaces between the user's handwritten characters.

K. The system of statement G, wherein the writing instrument carriage contains an ink dispensing unit.

L. The system of statement G, wherein the processing apparatus wirelessly couples to the portable writing stage.

M. The system of statement L, wherein the processing apparatus is included in the stylus.

N. The system of statement L, wherein the processing apparatus is included in a touch-screen device.

O. A method of tremor reduction, comprising:
receiving data, describing a user's movement of a stylus, with a processing apparatus;
filtering tremor data from the data using the processing apparatus to create filtered movement data;
sending the filtered movement data to a mechanical stage, wherein the mechanical stage includes a mobile segment and an immobile segment; and in response to the filtered movement data, manipulating the mobile segment of the mechanical stage to trace shapes conveyed in the filtered movement data.

P. The method of statement O, wherein the mobile segment of the mechanical stage is configured to move in a two-dimensional ("2D") plane and hold one of a pen or pencil.

Q. The method of statement P, wherein the mobile segment of the mechanical stage is configured to move orthogonal to the 2D plane to disengage the pen or pencil from a writing surface.

R. The method of any one of statements O-Q, wherein the stylus has a pen form-factor and the user's movement includes writing.

S. The method of any one of statements O-R, further comprising down-scaling the user's movement in the data to create the filtered movement data.

T. The method of any one of statements O-S, wherein filtering includes adaptive filtering algorithms, wherein the processing apparatus observes user-specific tremor parameters from the data and stores the user-specific tremor parameters in a memory, and wherein the processing apparatus removes the user-specific tremor parameters from the user's movement to create the filtered movement data.

U. The method of any one of statements O-T, wherein filtering includes at least one of low pass filtering, notch filtering, or weighted Fourier linear combination.

V. The method of statement any one of statements O-U, wherein sending the filtered movement data includes wirelessly transmitting the filtered movement data.

W. The method of any one of statements O-V, wherein receiving data, including the user's movement of the stylus, includes at least one of the stylus motion tracking the user's movement of the stylus or the processing apparatus motion tracking the user's movement of the stylus.

X. A system including:
the portable writing apparatus of any one of statements A-F; and
a handwriting input source for providing data describing a user's handwritten characters to be received as input data by the portable writing apparatus.

Y. The system of statement X, wherein the handwriting input source includes a stylus and a tablet for recording the user's stylus strokes on the tablet.

Z. The system of statement X, wherein the handwriting input source includes:
a stylus to output data describing a user's handwritten characters; and
a processing apparatus to receive the data describing the user's handwritten characters from the stylus, and filter tremor data from the data describing the user's handwritten characters, wherein the processing apparatus electrically or wirelessly couples to the portable writing stage to output filtered data to be received as input data by the portable writing stage.

ZA. The system of statement Z, having any feature as set out in any one of statements G-N.

ZB. The method or any method step of any one of statements O-W as applied to an apparatus/system as set out in any one of statements A-N or X-ZA.

What is claimed is:

1. A portable writing apparatus, comprising:
a writing instrument carriage shaped to removably hold a writing instrument and change between types of the writing instrument;
an actuator system coupled to the writing instrument carriage to move the writing instrument carriage;
a pressure sensor system coupled to measure a pressure applied by the writing instrument; and
a controller electrically coupled to the actuator system and the pressure sensor system, wherein the controller includes logic that when executed by the controller causes the controller to perform operations including:
receiving input data describing a user's handwritten characters;
controlling the actuator system to move the writing instrument carriage in response to the input data, wherein the writing instrument carriage recreates a shape of the user's handwritten characters; and
measuring the pressure applied by the writing instrument while the writing instrument carriage recreates a shape of the user's handwritten characters; and
adjusting the pressure applied by the actuator system.

2. The portable writing apparatus of claim 1, wherein the input data is filtered to remove tremor data from the input data describing the user's handwritten characters.

3. The portable writing apparatus of claim 2, wherein the input data is scaled to reduce a size of the user's handwritten characters.

4. The portable writing apparatus of claim 3, wherein the controller further includes logic that when executed by the controller causes the controller to perform operations including filtering the input data and scaling the input data.

5. The portable writing apparatus of claim 1, wherein the actuator system is coupled to the writing instrument carriage to move the writing instrument carriage orthogonal to a two-dimensional (2D) plane to engage and disengage a writing instrument from a writing surface.

6. The portable writing apparatus of claim 1, wherein the actuator system includes at least two stepper motors electrically coupled to the controller, and wherein the at least two stepper motors move independently from one another in repose to the input data.

7. The portable writing apparatus of claim 1, wherein the instrument carriage includes at least one of electronic clamps, spring loaded clamps, or a screw-tight structure to removably hold the writing instrument.

8. The portable writing apparatus of claim 1, further comprising an optical sensor coupled to the controller, wherein the controller further includes logic that when executed by the controller causes the controller to perform operations including:
examining, using the optical sensor, a line drawn with the writing instrument; and
adjusting the pressure applied by the actuator system.

9. A system, comprising:
a portable writing stage including:
a writing instrument carriage shaped to removably hold a writing instrument and change between types of the writing instrument;
an actuator system coupled to control the writing instrument carriage and move the writing instrument carriage;
a pressure sensor system coupled to measure a pressure applied by the writing instrument; and
a controller electrically coupled to the actuator system to control a position of the writing instrument carriage by manipulating the actuator system, wherein the controller is coupled to the pressure sensor system to measure the pressure applied by the writing instrument while the actuator system manipulates the writing instrument carriage, and wherein the controller adjusts the pressure applied by the actuator system to the writing instrument carriage;

a stylus to output data describing a user's handwritten characters; and a processing apparatus to receive the data describing the user's handwritten characters from the stylus, and filter tremor data from the data describing the user's handwritten characters, wherein the processing apparatus electrically or wirelessly couples to the portable writing stage to output filtered data to the portable writing stage, and wherein the filtered data causes the actuator system to move the writing instrument carriage and recreate a shape of the user's handwritten characters.

10. The system of claim 9, wherein the processing apparatus down-scales the user's handwritten characters in the data received from the stylus.

11. The system of claim 9, wherein the writing instrument carriage is configured to receive a pen or pencil, and wherein the actuator system is coupled to the writing instrument carriage to move the writing instrument carriage orthogonal to a two-dimensional (2D) plane to disengage the pen or pencil from a writing surface in response to spaces between the user's handwritten characters.

12. The system of claim 9, wherein the processing apparatus wirelessly couples to the portable writing stage.

13. The system of claim 12, wherein the processing apparatus is included in a touch-screen device.

14. A method of tremor reduction, comprising:

receiving data, describing a user's movement of a stylus, with a processing apparatus;

filtering tremor data from the data using the processing apparatus to create filtered movement data;

sending the filtered movement data to a mechanical stage, wherein the mechanical stage includes a mobile segment and an immobile segment, wherein the mobile segment is shaped to removably hold a writing instrument and change between types of the writing instrument;

in response to the filtered movement data, manipulating the mobile segment of the mechanical stage to trace shapes conveyed in the filtered movement data; and determining a pressure applied by the writing instrument while the mobile segment traces the shapes conveyed in the filtered movement data; and adjusting the pressure applied by the writing instrument.

15. The method of claim 14, wherein the mobile segment of the mechanical stage is configured to move in a two-dimensional ("2D") plane and hold one of a pen or pencil.

16. The method of claim 15, wherein the mobile segment of the mechanical stage is configured to move orthogonal to the 2D plane to disengage the pen or pencil from a writing surface.

17. The method of claim 14, wherein the stylus has a pen form-factor and the user's movement includes writing.

18. The method of claim 14, further comprising down-scaling the user's movement in the data to create the filtered movement data.

19. The method of claim 14, wherein filtering includes adaptive filtering algorithms, wherein the processing apparatus observes user-specific tremor parameters from the data and stores the user-specific tremor parameters in a memory, and wherein the processing apparatus removes the user-specific tremor parameters from the user's movement to create the filtered movement data.

20. The method of claim 14, wherein filtering includes at least one of low pass filtering, or notch filtering.

21. The method of claim 14, wherein receiving data, including the user's movement of the stylus, includes at least one of the stylus motion tracking the user's movement of the stylus or the processing apparatus motion tracking the user's movement of the stylus.

22. The method of claim 19, wherein the adaptive filtering algorithms include a machine learning algorithm structured to learn the user-specific tremor parameters.

* * * * *